United States Patent
Matsugashita

(10) Patent No.: US 8,560,620 B2
(45) Date of Patent: Oct. 15, 2013

(54) INFORMATION PROCESSING APPARATUS, CONTROL METHOD OF E-MAIL APPENDED DOCUMENT IN THAT INFORMATION PROCESSING APPARATUS, AND STORAGE MEDIUM STORING PROGRAM THEREOF

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/250,075

(22) Filed: Sep. 30, 2011

(65) Prior Publication Data

US 2012/0110098 A1   May 3, 2012

(30) Foreign Application Priority Data

Oct. 27, 2010   (JP) ................. 2010-241366

(51) Int. Cl.
    *G06F 15/16*   (2006.01)
(52) U.S. Cl.
    USPC .............................. 709/206; 358/1.15; 705/67
(58) Field of Classification Search
    USPC ........................................................ 709/206
    See application file for complete search history.

(56) References Cited

U.S. PATENT DOCUMENTS

| | | | |
|---|---|---|---|
| 2002/0131070 A1* | 9/2002 | Housel et al. ............... | 358/1.15 |
| 2003/0217107 A1* | 11/2003 | Parry ........................... | 709/206 |
| 2006/0092469 A1* | 5/2006 | Fu et al. ....................... | 358/1.15 |
| 2009/0307029 A1* | 12/2009 | Ramanathan et al. ............ | 705/7 |
| 2010/0088178 A1* | 4/2010 | Gnanasambandam et al. ......................... | 705/14.49 |
| 2010/0309505 A1* | 12/2010 | Partridge et al. ............. | 358/1.15 |
| 2012/0042018 A1* | 2/2012 | Singh et al. .................. | 709/206 |

FOREIGN PATENT DOCUMENTS

JP   2007-072638   3/2007

* cited by examiner

*Primary Examiner* — Hamza Algibhah
(74) *Attorney, Agent, or Firm* — Fitzpatrick, Cella, Harper & Scinto

(57) ABSTRACT

An e-mail message to which a document is attached is received, and it is determined whether or not a digital signature is appended to the e-mail message. The document attached to the e-mail message is saved as an approved document, which is approved for printing, when it is determined that the digital signature is appended to the e-mail message. On the other hand, the document attached to the e-mail message is saved as a non-approved document, which is not approved for printing, in association with an e-mail address of the e-mail message when it is determined that the digital signature is not appended to the e-mail message. User information is acquired, and the non-approved document saved in association with an e-mail address that is associated in advance with the user information is retrieved. The retrieved non-approved document is changed to an approved document, and that approved document is saved.

6 Claims, 11 Drawing Sheets

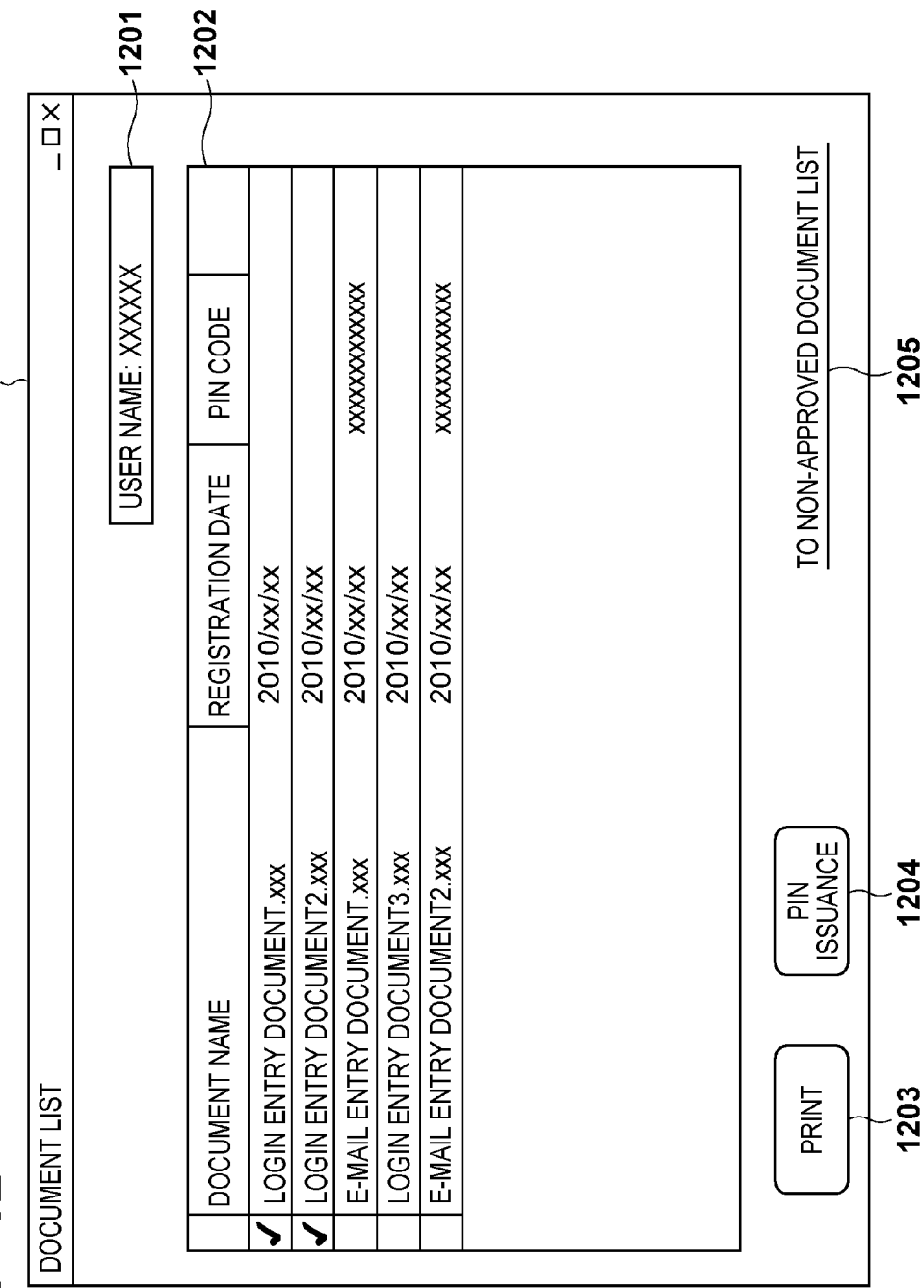

INFORMATION PROCESSING APPARATUS, CONTROL METHOD OF E-MAIL APPENDED DOCUMENT IN THAT INFORMATION PROCESSING APPARATUS, AND STORAGE MEDIUM STORING PROGRAM THEREOF

BACKGROUND OF THE INVENTION

1. Field of the Invention

The present invention relates to an information processing apparatus for controlling an e-mail attached document, a control method of an e-mail attached document in that information processing apparatus, and a storage medium storing a program thereof.

2. Description of the Related Art

As a method of printing a document saved in a mobile terminal having no print function, the following method is known. The user attaches a document to be printed, which is saved in the mobile terminal, to an e-mail message, and sends that e-mail message to a predetermined address. A print management server which received the e-mail message temporarily saves the document. Then, the user prints the document at an arbitrary timing using a printing apparatus connected to the print management server via a network. The print management server can specify a document to be printed by managing the attached document in association with the user or a temporarily issued PIN (Personal Identification Number) code.

Japanese Patent Laid-Open No. 2007-072638 describes a method of specifying a user based on information set in a header of an e-mail message, and managing an attached file in association with the specified user.

However, the conventional method which simply trusts information of the e-mail header to specify the user suffers the following problem. Since an SMTP (Simple Mail Transfer Protocol) as an e-mail exchange protocol does not have any function of detecting falsification of a header, falsification and spoofing are relatively easy. Therefore, a problem is particularly posed when an e-mail message is sent using the Internet via a public network.

In order to prevent falsification and spoofing upon exchanging an e-mail message, a digital signature function such as S/MIME (Secure MIME) and PGP (Pretty Good Privacy) is available. Using such digital signature function, a user as a sender can be specified from information of an e-mail header with high reliability. However, an e-mail sending function of a mobile terminal does not normally include such digital signature function.

SUMMARY OF THE INVENTION

An aspect of the present invention is to eliminate the above-mentioned problems with conventional technology. The present invention provides an information processing apparatus which improves reliability of user authentication upon reception of an e-mail message to which no digital signature is appended, a control method of an e-mail attached document in that information processing apparatus, and a storage medium storing a program thereof.

The present invention in its first aspect provides an information processing apparatus comprising: an e-mail reception unit configured to receive an e-mail message to which a document is attached; a signature determination unit configured to determine whether or not a digital signature is appended to the e-mail message; a saving unit configured to save the document attached to the e-mail message as an approved document, which is approved for printing, when the signature determination unit determines that the digital signature is appended to the e-mail message, and save the document attached to the e-mail message as a non-approved document, which is not approved for printing, in association with an e-mail address of the e-mail message when the signature determination unit determines that the digital signature is not appended to the e-mail message; an acquisition unit configured to acquire user information; a retrieval unit configured to retrieve the non-approved document saved in association with an e-mail address that is associated in advance with the user information; and a re-saving unit configured to change the non-approved document retrieved by the retrieval unit to an approved document, and saves the approved document.

The present invention in its second aspect provides a control method of an e-mail attached document executed by an information processing apparatus, the method comprising: an e-mail reception step of receiving an e-mail message to which a document is attached; a signature determination step of determining whether or not a digital signature is appended to the e-mail message; a saving step of saving the document attached to the e-mail message as an approved document, which is approved for printing, when it is determined in the signature determination step that the digital signature is appended to the e-mail message, and saving the document attached to the e-mail message as a non-approved document, which is not approved for printing, in association with an e-mail address of the e-mail message when it is determined in the signature determination step that the digital signature is not appended to the e-mail message; an acquisition step of acquiring user information; a retrieval step of retrieving the non-approved document saved in association with an e-mail address that is associated in advance with the user information; and a re-saving step of changing the non-approved document retrieved in the retrieval step to an approved document, and saving the approved document.

The present invention in its third aspect provides a computer-readable storage medium storing a program for controlling a computer to function to: receive an e-mail message to which a document is attached; determine whether or not a digital signature is appended to the e-mail message; save the document attached to the e-mail message as an approved document, which is approved for printing, when it is determined that the digital signature is appended to the e-mail message, and save the document attached to the e-mail message as a non-approved document, which is not approved for printing, in association with an e-mail address of the e-mail message when it is determined that the digital signature is not appended to the e-mail message; acquire user information; retrieve the non-approved document saved in association with an e-mail address that is associated in advance with the user information; and change the retrieved non-approved document to an approved document, and save the approved document.

According to the present invention, when an e-mail message to which no digital signature is appended is received, reliability of user authentication can be improved.

Further features of the present invention will become apparent from the following description of exemplary embodiments with reference to the attached drawings.

BRIEF DESCRIPTION OF THE DRAWINGS

FIG. 12 is a view showing an example of a screen for displaying an approved document list; and FIG. 13 is a view showing an example of a screen for displaying a non-approved document list.

DESCRIPTION OF THE EMBODIMENTS

Figure 1:
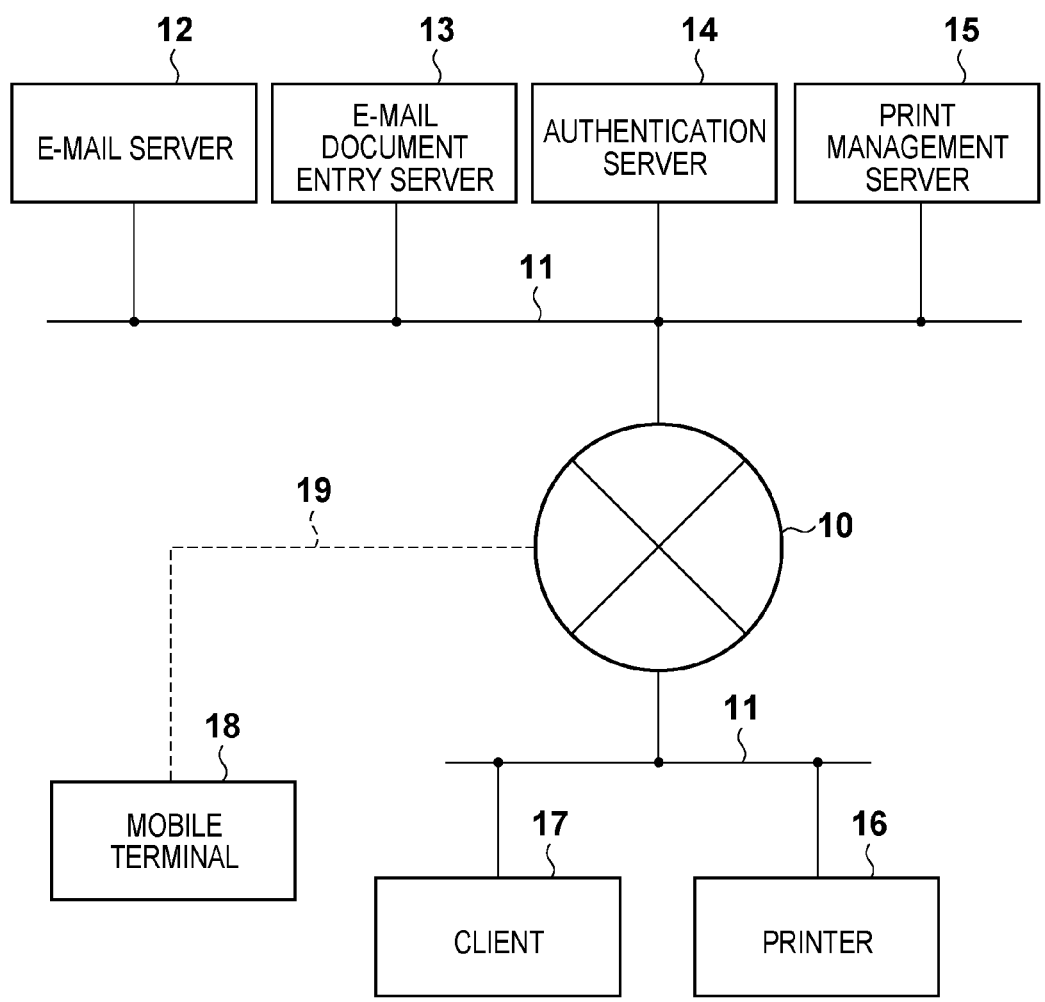
FIG. 1 is a block diagram showing the system arrangement.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will not be repeated.

FIG. 1 is a block diagram showing the system arrangement according to an embodiment of the present invention. A WAN 10 is a Wide Area Network, and a WWW (World Wide Web) system is established in this embodiment. A LAN 11 is a Local Area Network, which connects the following components. A wireless network 19 is that which includes a public network and wireless base station. A mobile terminal 18 is connected to the WWW system configured by the WAN 10 via the wireless network 19.

An e-mail server 12 processes e-mail messages in response to e-mail exchange requests from the mobile terminal 18, a client terminal 17, and an e-mail document entry server 13 via the LAN 11 and WAN 10. The e-mail server 12 includes an e-mail service (not shown). The e-mail service includes one or a plurality of e-mail addresses, and receives and manages e-mail messages sent to these e-mail addresses. Also, the e-mail service sends e-mail messages to other e-mail addresses.

The e-mail document entry server 13 periodically confirms e-mail messages received by the e-mail server 12, and registers documents in a print management server 15 according to the contents of the e-mail messages. An authentication server 14 authenticates a user in response to a Web request from the client 17 via the WWW system or requests from respective servers, and executes processing in response to a user information acquisition request. The print management server 15 registers a document in response to a Web request from the client 17 or a request from the e-mail document entry server 13. Also, the print management server 15 controls a designated printer 16 to print a document designated by a Web request from the client 17.

The printer 16 prints a designated document. The client 17 issues a Web request to respective servers via the LAN 11 and WAN 10. The client 17 is, for example, a computer which includes a Web browser required to use the WWW system. The mobile terminal 18 has a function of establishing a connection to the WWW system via the wireless network 19. The mobile terminal 18 is a mobile phone or mobile computer which includes a mailer required to send/receive e-mail messages, and a Web browser.

Figure 2:
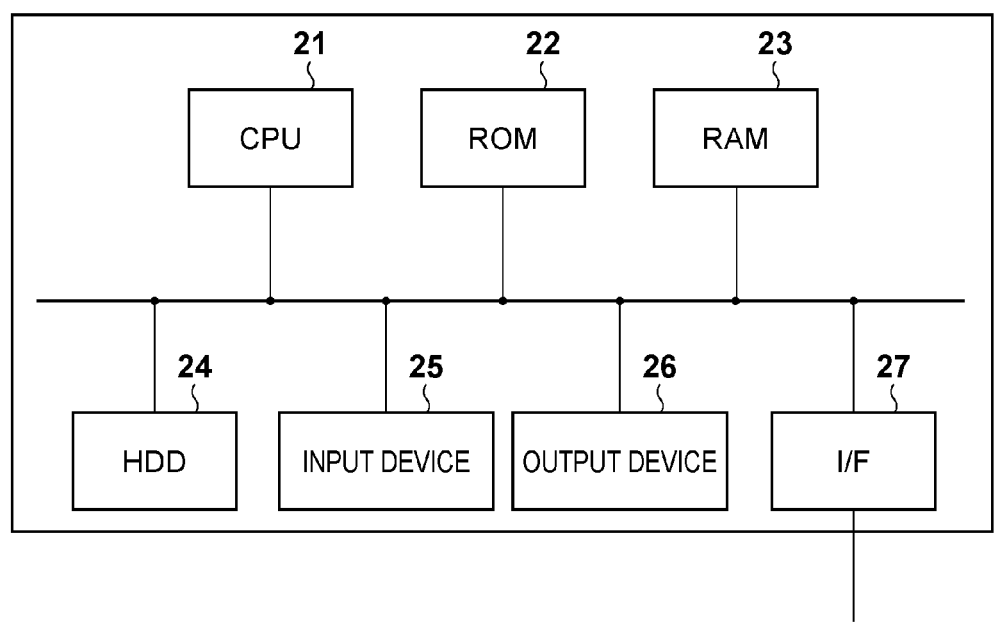
FIG. 2 is a block diagram showing the hardware arrangement of an e-mail server, e-mail document entry server, authentication server, print management server, or client.

FIG. 2 is a block diagram showing the hardware arrangement of the e-mail server 12, e-mail document entry server 13, authentication server 14, print management server 15, or client 17 shown in FIG. 1. Each of these apparatuses has the hardware arrangement of a general information processing apparatus such as a PC. A CPU 21 executes programs which are required to directly or indirectly control blocks to be described below, which are connected via an internal bus, and to implement the operations of this embodiment. A ROM 22 stores a BIOS. A RAM 23 is used as a work area of the CPU 21, and also as a temporary storage area used to load software modules required to implement the operations of this embodiment. An HDD 24 is a hard disk drive or solid-state drive (SSD) which stores an OS as basic software and software modules. An input device 25 includes a keyboard and pointing device (neither are shown). An output device 26 is, for example, a display. An interface (I/F) 27 is required to connect the LAN 11 or WAN 10.

After the self apparatus is activated, the CPU 21 executes the BIOS, and the OS is executably loaded from the HDD 24 onto the RAM 23. The CPU 21 executably loads various software modules (to be described later) from the HDD 24 onto the RAM 23 as needed. The software modules are executed by the CPU 21 to operate in cooperation of the aforementioned devices. The I/F 27 is connected to the LAN 11, and is controlled by the CPU 21 according to the operation of the OS so as to implement exchange of requests between services of the respective servers. Also, the I/F 27 is connected to the WAN 10 via the LAN 11, and is controlled by the CPU 21 according to the operation of the OS so as to implement communications in the WWW system.

Figure 3:
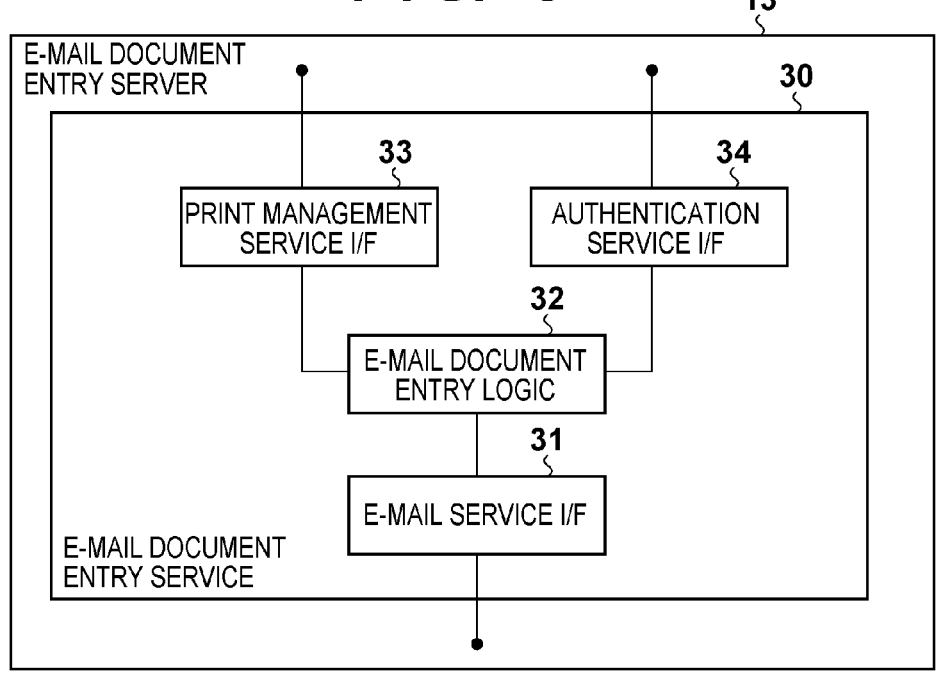
FIG. 3 is a block diagram showing software modules on the e-mail document entry server.

FIG. 3 is a block diagram showing software modules which configure an e-mail document entry service 30 that runs on the e-mail document entry server 13. Note that the respective modules stored in the HDD 24 of the e-mail document entry server 13, are loaded by the CPU 21 of the e-mail document entry server 13 onto the RAM 23 of the e-mail document entry server 13, and are executed. An e-mail service I/F 31 is an interface module, which is required to confirm and acquire e-mail messages sent to the e-mail server 12 or to send e-mail messages via the e-mail server 12. A print management service I/F 33 is an interface module which is required to register a document in a print management service 50 (to be described later) of the print management server 15. An authentication service I/F 34 is an interface module which is required to request an authentication service 40 (to be described later) of the authentication server 14 to authenticate a user, and to acquire user information.

An e-mail document entry logic 32 is a module which is required to control ON/OFF of authentication and ON/OFF of attached document registration according to contents of an e-mail message. The e-mail document entry logic 32 confirms, acquires, and sends an e-mail message via the e-mail service I/F 31. Also, the e-mail document entry logic 32 acquires and authenticates user information via the authentication service I/F 34 according to a signature and contents of an e-mail message, or registers a document via the print management service I/F 33. Furthermore, the e-mail document entry logic 32 issues a PIN code required to specify a document at the time of registration of that document, and returns it as a response to a sender of an e-mail message via the e-mail service I/F 31. A series of e-mail processes executed in cooperation of the respective modules will be explained as "processing executed by the e-mail document entry service 30" hereinafter.

Figure 4:
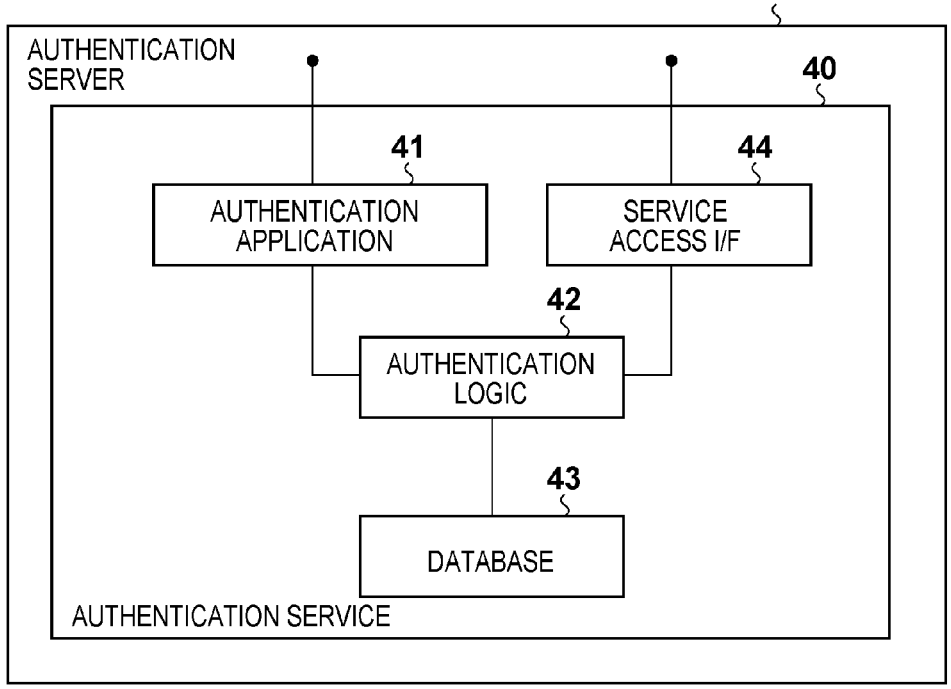
FIG. 4 is a block diagram showing software modules on the authentication server.

FIG. 4 is a block diagram showing software modules which configure the authentication service 40 that runs on the authentication server 14. Note that the respective modules are stored in the HDD 24 of the authentication server 14, and are loaded by the CPU 21 of the authentication server 14 onto the RAM 23 of the authentication server 14 when they are executed. An authentication application 41 is a module which includes a Web interface that accepts a Web requests from the client 17. The authentication application 41 generates and returns, as a response, an authentication screen (not shown) in response to a Web authentication request from a Web browser included in the client 17. In this case, this embodiment will explain, as an authentication method in response to the Web authentication request, an authentication method which acquires a user ID required to specify a user and a password as secret information, and matches them with user information registered in advance. However, the present invention is not limited to such specific authentication method, and other authentication methods, for example, that by confirming a certificate and that by confirming biological information of the user may be used. Also, the authentication application 41 generates a temporary registration screen (not shown) used to temporarily register an e-mail address in user information, and a formal registration screen (not shown) used to formally register the e-mail address. Details of the e-mail address registration sequence will be described later.

The Web authentication request accepted by the authentication application 41 is processed by an authentication logic 42. When authentication has succeeded, the authentication logic 42 generates an authentication token. The authentication logic 42 performs an authentication action according to a logic, which is set in advance. In this case, the authentication logic 42 accesses a database 43 to perform matching with user information, which is registered in advance. For example, the authentication logic 42 performs matching of a combination of a user ID and password to determine whether or not authentication has succeeded. The generated authentication token is returned as a response to the client 17 via the authentication application 41.

A service access I/F 44 is an interface module which is required to accept requests from services of other servers and to send requests to services of other servers. In this case, the requests to be accepted include a user information acquisition request, and an authentication request using an e-mail address registered in user information. These requests received by the service access I/F 44 are processed by a logic set in advance in the authentication logic 42. Also, the requests to be sent include, for example, an e-mail sending request generated by the authentication logic 42. A series of authentication processes executed in cooperation of the respective modules will be described as "processing executed by the authentication service 40" hereinafter.

Figure 5:
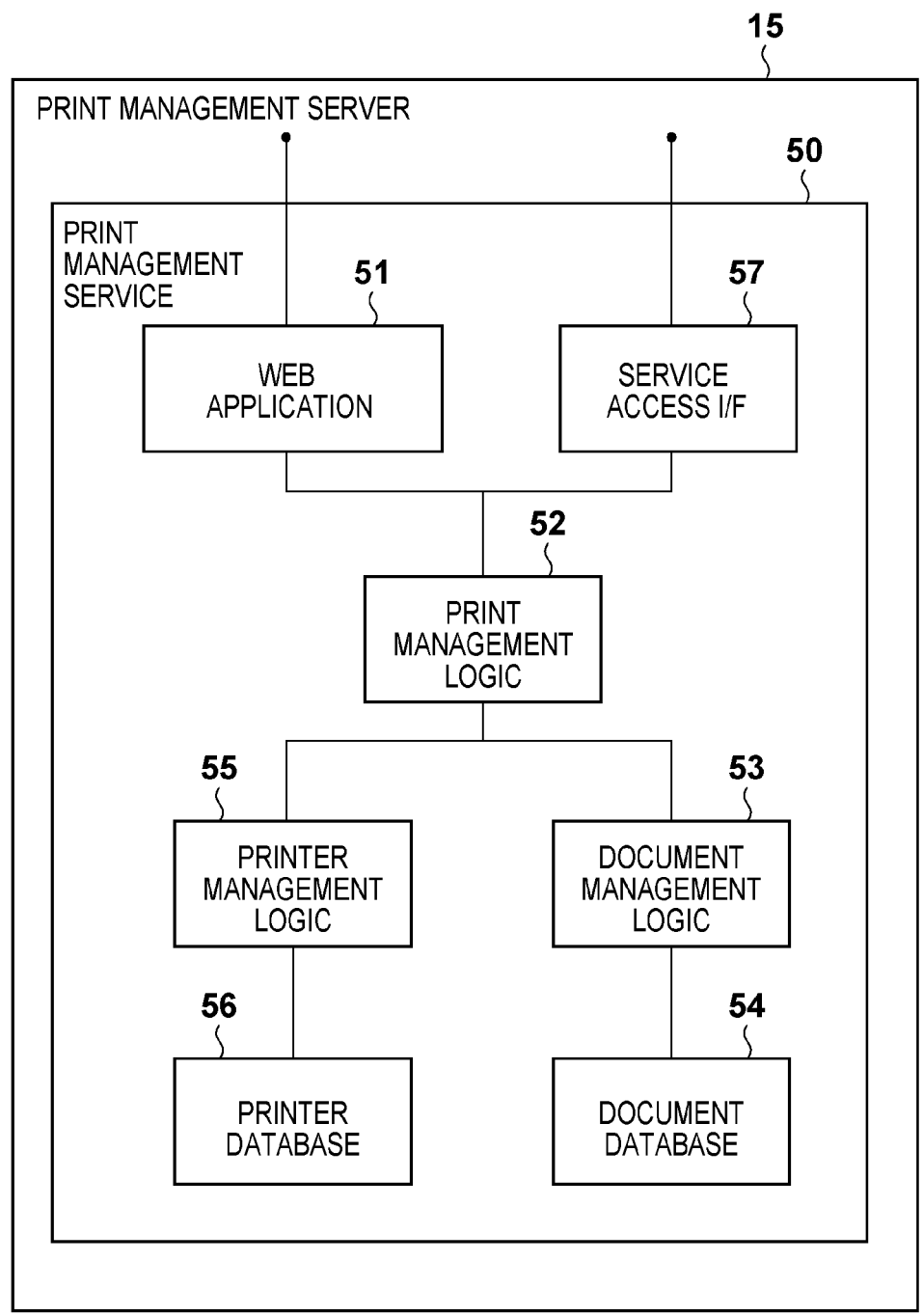
FIG. 5 is a block diagram showing software modules on a print management server 15.

FIG. 5 is a block diagram showing software modules which configure the print management service 50 that runs on the print management server 15. Note that the respective modules stored in the HDD 24 of the print management server 15, are loaded by the CPU 21 of the print management server 15 onto the RAM 23 of the print management server 15, and are executed. A Web application 51 is a module which includes a Web interface that accepts a Web access from the client 17. The Web application 51 generates and returns, as responses, respective document list screens used to display an approved document list and non-approved document list, in which documents are registered by the user, in response to a Web request from a Web browser included in the client 17. These screens will be described later. Each document list screen is configured to send a print request. Upon accepting a print request from the user, the Web application 51 generates and returns, as a response, a printer list screen (not shown) used to select a printer to be used in print processing.

Upon displaying these screens, when the configuration of the authentication service 40 adopts a reverse proxy system, for example, the following processing is executed. The Web application 51 accepts a Web access given with user information, which has been authenticated by the authentication service 40, via the authentication service 40 without directly accepting the Web access from the client 17. Alternatively, as the configuration of the authentication service 40, an authentication configuration based on an agent system may be used. In this case, an authentication agent (not shown) is added in the Web application 51, so that a Web access from the client 17 is accepted by the authentication agent, and is transferred to the authentication service 40. When authentication has succeeded in the authentication service 40, authenticated user information is given to a Web request, which is sent to the Web application 51 via the authentication agent. Upon generation of the aforementioned screens, the Web application 51 sends user information to a print management logic 52, and acquires information of documents and printers. A printer management logic 55 acquires information of printers managed by a printer database 56. A document management logic 53 acquires information of documents managed by a document database 54. In this case, the document management logic 53 retrieves documents using the received user information as a key.

A print request accepted by the Web application 51 is processed by the print management logic 52 to execute print processing. This print processing is executed when the user issues a pull-print instruction to a designated printer via the Web browser of the client 17 or when a printer designated by the user directly issues a pull-print instruction. These printers issue a Web request to the document management logic 53 in response to the pull-print instruction to acquire document data, and execute print processing. Note that in the method which allows a printer to directly issue a pull-print instruction, that instruction may be issued from a screen generated by the Web application 51, or from a screen (not shown) used to input a PIN code set in a document. The screen used to input the PIN code is configured to be accessible without any authentication.

A service access I/F 57 is an interface module which is required to accept requests from services of other servers. The requests to be accepted include a document registration request required to accept registration of a document. These requests received by the service access I/F 57 are processed by a logic which is set in advance in the print management logic 52. A series of print management processes executed in cooperation of the respective modules will be explained as "processing executed by the print management service 50" hereinafter.

Figure 6:
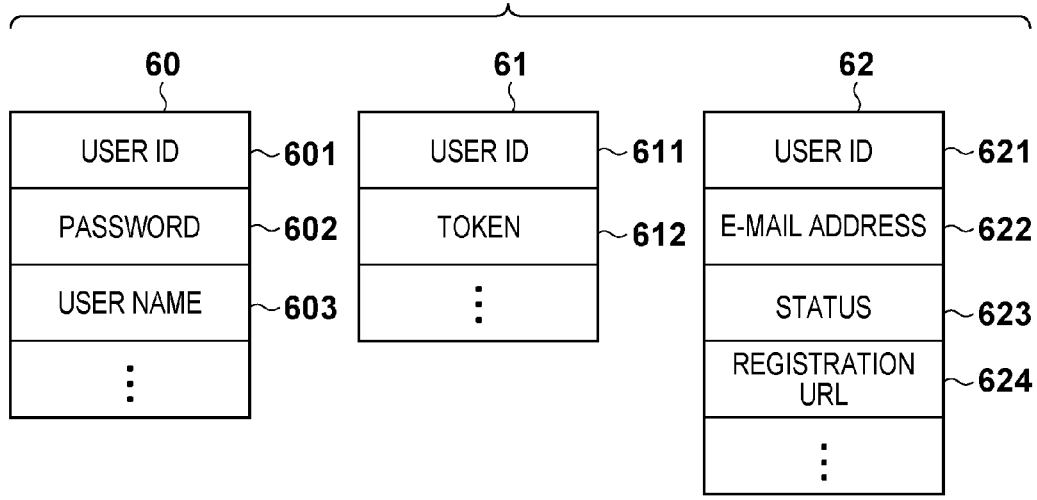
FIG. 6 is a view showing an example of user information, user token information, and user e-mail information managed by an authentication server 14.

FIG. 6 is a view showing an example of user information 60, user token information 61, and user e-mail information 62, which are managed in the database 43 of the authentication server 14 shown in FIG. 4. The user information 60 includes a user ID 601 required to specify a user, a password 602 as secret information, and a user name 603 as a display name of the user. The user token information 61 includes a user ID 611 required to specify the user, and an authentication token 612 which indicates that the user has been authenticated. The user e-mail information 62 includes a user ID 621 required to specify the user, an e-mail address 622, a status 623 indicating as to whether that user e-mail information 62 is temporarily or formally registered, and a formal registration URL 624 as a URL of a screen used to formally register the information. As shown in FIG. 6, the user information 60, user token information 61, and user e-mail information 62 are associated with each other by the user ID.

Figure 7:
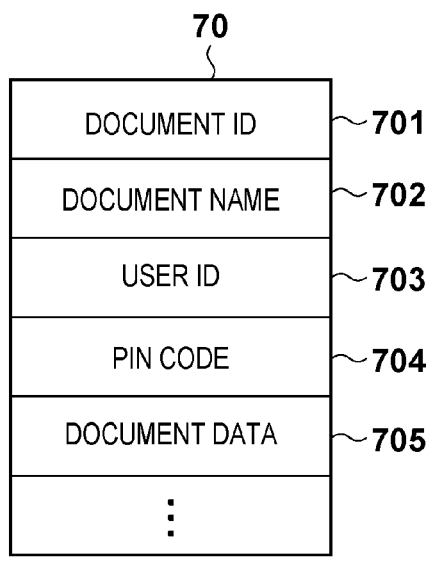
FIG. 7 is a view showing an example of approved document information managed by the print management server.

FIG. 7 is a view showing an example of approved document information managed by the document database 54 of the print management server 15 shown in FIG. 5. Document information 70 includes a document ID 701 required to specify a document, a document name 702 as a display name of the document, a user ID 703 indicating a creator of the document, a PIN code 704 required to specify the document, and document data 705. As the document data 705, binary data of the document data may be stored, or the document may be stored in another area, and information indicating a path to that storage location may be stored. Also, the document information 70 is managed by the document database 54 so as to be retrieved using the user ID 703 as a key.

Figure 8:
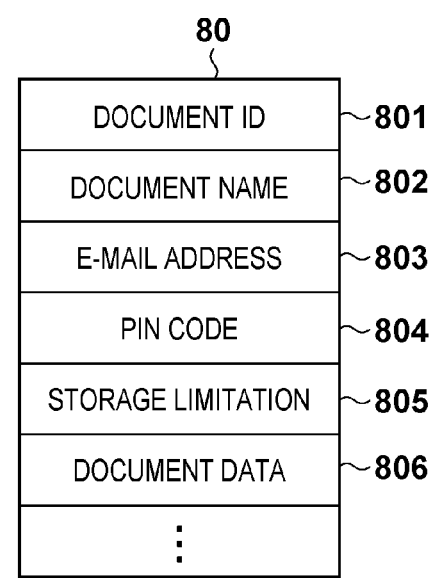
FIG. 8 is a view showing an example of non-approved document information managed by the print management server.

FIG. 8 is a view showing an example of non-approved document information managed by the document database 54 of the print management server 15 shown in FIG. 5. Non-approved document information 80 includes a document ID 801 required to specify a document, a document name 802 as a display name of the document, a PIN code 804 required to specify the document, and document data 806. These pieces of information are the same as those in the approved document information 70 shown in FIG. 7. The non-approved document information 80 further includes a sender e-mail address 803 upon reception of the document, and a non-approved document storage limitation 805. Also, the non-approved document information 80 is managed by the document database 54 so as to be retrieved using the e-mail address 803 as a key.

The sequence of processing of an e-mail attached document in this embodiment will be described below.

Figure 9A:
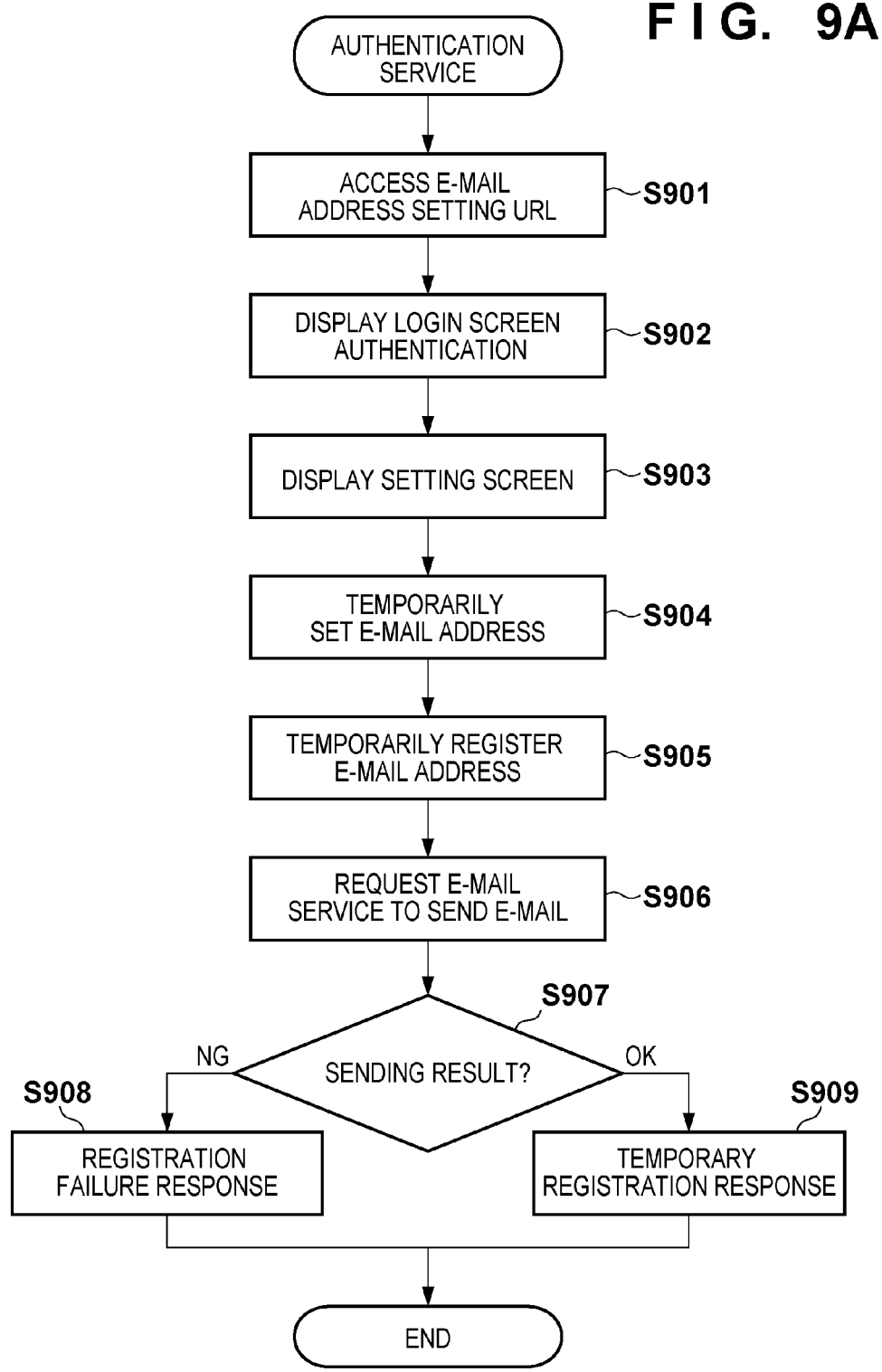
FIGS. 9A and 9B are flowcharts showing the sequence of e-mail address registration processing executed by the authentication server 14.
Figure 9B:
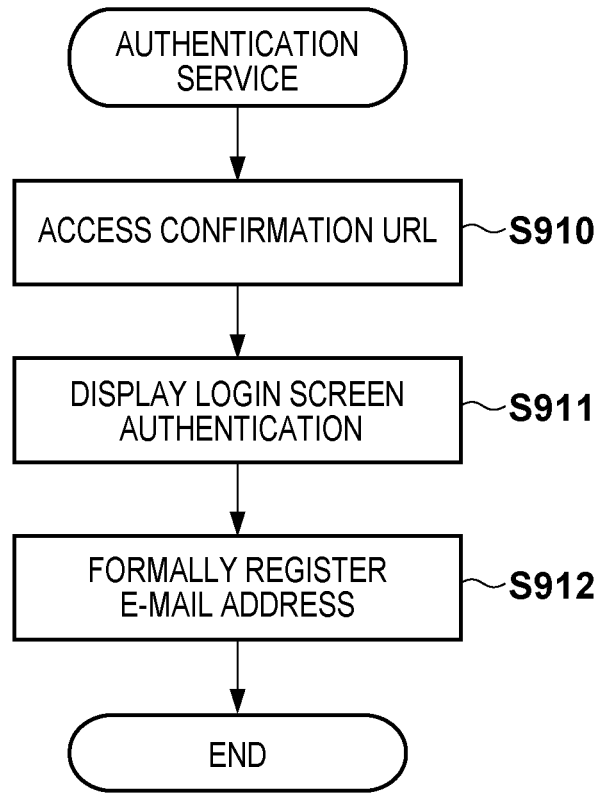

FIGS. 9A and 9B are flowcharts showing the sequence of e-mail address registration processing executed by the authentication service 40 of the authentication server 14. The processes shown in FIGS. 9A and 9B are executed by, for example, the CPU 21 of the authentication server 14. When the mobile terminal 18 or client 17 sends a Web request to an e-mail address setting URL, the authentication service 40 displays a login screen used to authenticate a user (S901). Then, the authentication service 40 authenticates the user based on information (user information) input on that login screen (S902). When the user has been authenticated, the authentication service 40 displays a setting screen used to set an e-mail address for the user indicated by that user information (S903: an example of setting screen display).

The authentication service 40 receives an e-mail address temporary setting Web request (S904). Then, the authentication service 40 sets the user information and the e-mail address of the authenticated user in a temporary registration state, as shown in the user e-mail information 62 (S905). In this case, the authentication service 40 issues a formal registration URL to the user. The authentication service 40 sends an e-mail message, which describes that the e-mail address is temporarily registered, and the formal registration URL, to the registered e-mail address via the e-mail service of the e-mail server 12 (S906). The authentication service 40 determines whether or not sending of the e-mail massage by the e-mail service of the e-mail server 12 has succeeded (S907). If it is determined that sending by the e-mail service of the e-mail server 12 has failed, the authentication service 40 discards the temporarily registered user e-mail information 62, and ends this processing (S908). On the other hand, if it is determined that sending has succeeded, the authentication service 40 determines that temporary registration has succeeded, and ends this processing (S909).

The sequence of processing executed when the authentication server 14 accepts an access from the mobile terminal 18 to the formal registration URL will be described below. If the authentication service 40 accepts an access from the mobile terminal 18 to the formal registration URL (S910), it displays a login screen (not shown) (S911). The process in step S911 is the same as that in step S902. Then, the authentication service 40 formally registers the user e-mail information 62 (S912).

With the processes shown in FIGS. 9A and 9B, the user information and user's e-mail address can be registered as the user e-mail information 62 in association with each other. Note that in this embodiment, the temporary registration state may have a limitation, and when that limitation has exceeded, the user e-mail information 62 may be discarded.

Figure 10:
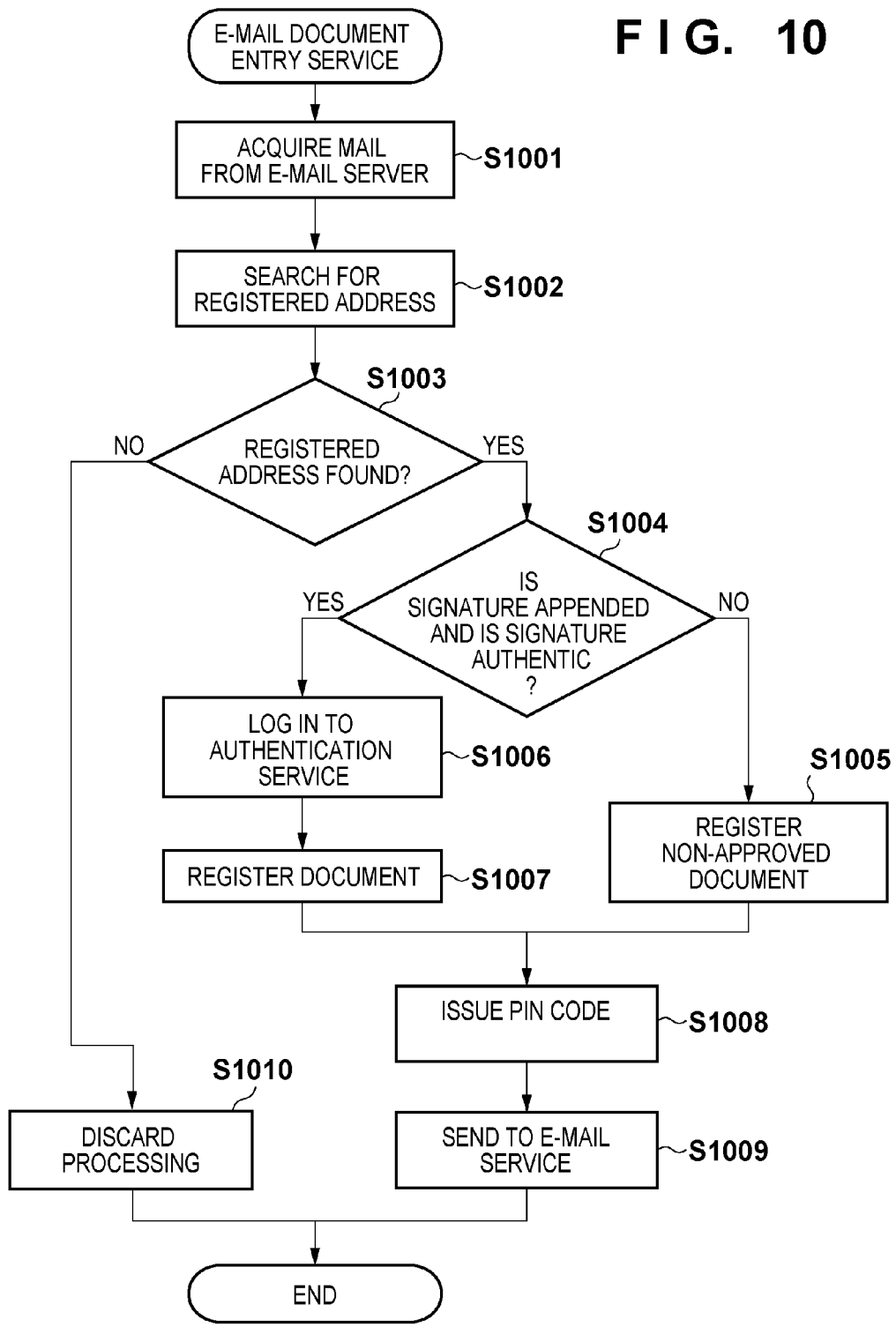
FIG. 10 is a flowchart showing the sequence of processing executed when the e-mail document entry server acquires an e-mail message attached with a print document.

FIG. 10 is a flowchart showing the sequence of processing executed when the e-mail document entry service 30 of the e-mail document entry server 13 acquires an e-mail message attached with a print document. The processing shown in FIG. 10 is executed by, for example, the CPU 21 of the e-mail document entry server 13. The e-mail document entry service 30 sends an inquiry about the presence/absence of a newly received e-mail message to the e-mail service of the e-mail server 12 at predetermined intervals. If a newly received e-mail message is present, the e-mail document entry service 30 acquires the e-mail message from the e-mail service of the e-mail server 12 (S1001: an example of e-mail reception). Next, the e-mail document entry service 30 searches whether or not a sender address of the acquired e-mail message is registered as the user e-mail information 62 (S1002: an example of mail address determination), and then determines whether or not the sender address is registered (S1003). If it is determined that the sender address is not registered as the user e-mail information 62 or it is in a temporary registration state, the e-mail document entry service 30 discards that e-mail message (S1010).

On the other hand, if it is determined that the sender address is registered as the user e-mail information 62, the e-mail document entry service 30 determines whether or not a digital signature is appended to a header of the e-mail message (S1004: an example of signature determination). In this case, as a signature method for an e-mail message, such as S/MIME (Secure MIME) or PGP (Pretty Good Privacy) may be used. When it is determined whether or not a digital signature is appended, whether or not that digital signal is authentic is also determined. The determination process of the digital signature in step S1004 may be executed according to a method defined for each protocol. For example, the validity of a public key may be confirmed using CA (Certificate Authority) of a certificate, and if the public key is valid, a signature is decrypted to acquire a digest of a document. Then, the document is converted into a digest to determine whether or not the document is falsified by checking if the two digests match.

If it is determined in step S1004 that no digital signature is appended or the digital signal is unauthentic, the e-mail document entry service 30 registers a document attached to the e-mail message as a non-approved document which is not approved for printing (for example, an unprintable document). That is, the e-mail document entry service 30 registers the non-approved document information 80 in the print management service 50 of the print management server 15 (S1005). In this embodiment, in this case, a storage limitation of the non-approved document may be set. The print management service 50 outputs a document registration record which allows to distinguish whether the registered document is an approved or non-approved document. That document registration record is used when, for example, a non-approved document is handled as a document which is not to be charged. After the document is registered as a non-approved document, the print management service 50 issues a document ID required to specify the document, and returns it as a response to the authentication service 40 of the authentication server 14.

If it is determined in step S1004 that the authentic digital signature is appended, the e-mail document entry service 30 logs in to the authentication service 40 of the authentication server 14 using the e-mail address to acquire an authentication token (S1006). Then, the e-mail document entry service 30 registers the document attached to the e-mail message, that is, the document information 70, together with the acquired authentication token in the print management service 50 of the print management server 15 as an approved document which is approved for printing (for example, a printable document) (S1007). In this case, since the e-mail document entry service 30 passes the authentication token to the print management server 15, the print management service 50 of the print management server 15 can determine that the user at the time of document registration is an authorized user, and can save the document in association with the user ID. After the document is registered, the print management service 50 of the print management server 15 issues an ID required to specify the document, and returns it as a response. In this case, the print management service 50 of the print management server 15 outputs an approved document registration record. That document registration record is used when, for example, the approved document is handled as a document which is to be charged.

Next, the e-mail document entry service 30 issues a PIN code in correspondence with the document ID (S1008). The issued PIN code is registered in the approved document information 70 or non-approved document information 80 in the print management service 50 of the print management server 15. The e-mail document entry service 30 creates an e-mail message which describes the issued PIN code and information indicating approved or non-approved document registration, a storage limitation of the non-approved document, and the like. Then, the e-mail document entry service 30 requests the e-mail service of the e-mail server 12 to send that e-mail message to the e-mail sender (S1009).

With the processing shown in FIG. 10, when a document attached to an e-mail message is sent from a mailer having an e-mail signature function, the e-mail document entry service 30 sends that document as an approved document which is approved for printing. On the other hand, when a document attached to an e-mail message is sent from a mailer which does not include any e-mail signature function, the e-mail document entry service 30 registers that document as a non-approved document which is not approved for printing. That is, in this embodiment, an e-mail attached document, which is sent from a mailer having the e-mail signature function, is determined using a digital signature, and when it is determined that an authentic digital signature is appended, that document is saved as an approved document. On the other hand, when a document is sent from a mailer which does not include any signature function, or when it is determined that an unauthentic digital signature is appended, that document is temporarily saved as a non-approved document. However, in this embodiment, as will be described below, even when a document is saved as a non-approved document, the user logs in using user information such as an ID and password, and can change the non-approved document to an approved document.

Figure 11:
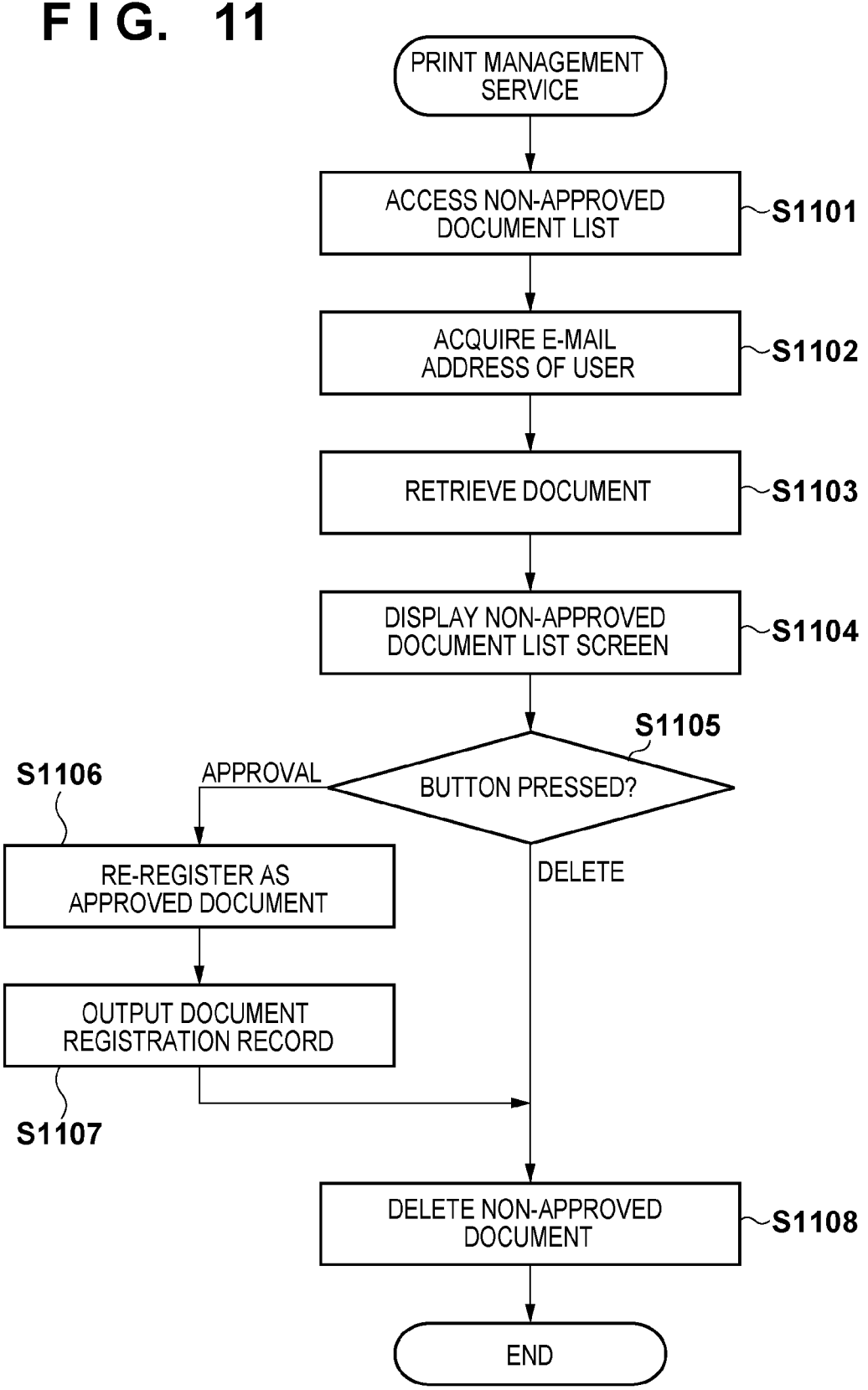
FIG. 11 is a flowchart showing the sequence of processing for re-registering, as an approved document, a document registered as a non-approved document.

FIG. 11 is a flowchart showing the sequence of processing executed when the print management service 50 of the print management server 15 re-registers (re-saves) a document, which is registered as a non-approved document by the processing shown in FIG. 10, as an approved document. The processing shown in FIG. 11 is executed by, for example, the CPU 21 of the print management server 15. The user logs in from the mobile terminal 18 to the system shown in FIG. 1 using, for example, user information of an ID and password. The print management service 50 acquires the user name 603 from the user information 60 including that login user information, and displays, for the user, an approved document list shown in FIG. 12 using that user name 603 as a keyword. Since the list is displayed using only the user name as a keyword in place of an e-mail address, not only approved documents, which are approved by the e-mail document entry service, but also those which are approved by other document entry services, are displayed together, as shown in FIG. 12.

FIG. 12 shows an example of a screen which displays the approved document list. A document list screen 1200 includes, as display items, an item 1201 which indicates the user name authenticated by the authentication service 40, and a document list 1202. Also, the document list screen 1200 includes, as request buttons, a print button 1203 used to issue a print request of a document selected by the user, and a PIN issuance button 1204 used to issue an issuance request of a PIN code of the selected document. Furthermore, the document list screen 1200 includes a non-approved document list screen link 1205 used to issue a move request to a non-approved document list screen. The document list 1202 includes item columns of a check button used to select a document to be manipulated, document name, registration date, and issued PIN code.

The print management service 50 accepts an access request from the user to a non-approved document list (S1101). The access request to the non-approved document list is issued when, for example, the user presses the aforementioned non-approved document list screen link 1205. The access request includes the authentication token, which has already been issued by the authentication service 40. Then, the print management service 50 acquires an e-mail address corresponding to the user from the authentication service 40 of the authentication server 14 based on the user e-mail information 62 using the authentication token (S1102). Then, the print management service 50 searches the non-approved document information 80 using the acquired e-mail address as a keyword to generate a list of non-approved documents (S1103). Next, the print management service 50 displays a non-approved document list screen for the user based on information of that list (S1104: an example of list display).

FIG. 13 shows an example of the non-approved document list screen generated by the print management service 50. A non-approved document list screen 1300 includes, as display items, an item 1301 which indicates the user name authenticated by the authentication service 40 of the authentication server 14, and a non-approved document list 1302. Also, the non-approved document list screen 1300 includes, as request buttons, an approval button 1303 used to issue an approval request of a selected document, and a delete button 1304 used to issue a delete request of a selected document. Furthermore, the non-approved document list screen 1300 includes an approved document list screen link 1305 used to issue a move request to the approved document list screen 1200 shown in FIG. 12. The non-approved document list 1302 includes item columns of a check button used to select a document to be manipulated, document name, e-mail sending date and time, sender e-mail address, and issued PIN code. Note that a storage limitation of each non-approved document may also be displayed.

Upon pressing of each button of the non-approved document list screen 1300, the print management service 50 branches processes depending on the type of button (S1105). If it is determined that the user presses the delete button 1304, the print management service 50 deletes the document to be manipulated (S1108). If it is determined that the user presses the approval button 1303, the print management service 50 re-registers the document to be manipulated as an approved document (S1106). More specifically, that document is re-saved as a document (approved document) of the user who has been authenticated by the authentication service 40 of the authentication server 14. In this case, the print management service 50 outputs an approved document registration record (S1107). The print management service 50 deletes the document, which is re-registered as an approved document, from the non-approved document list 1202 (S1108).

As described above, in this embodiment, even when an e-mail attached document is sent from a mailer which does not include any e-mail signature function, that document can be managed as an approved document.

This embodiment has explained the configuration in which the e-mail document entry service 30, authentication service 40, and print management services 50 respectively host in the independent servers. However, the present invention is not limited to such specific configuration. For example, a configuration in which these services host in a single server together or a configuration in which load distribution is attained by clustering to a plurality of server machines may be adopted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-241366, filed Oct. 27, 2010, which is hereby incorporated by reference herein in its entirety.

What is claimed is:

1. An information processing apparatus comprising:
   an e-mail reception unit configured to receive an e-mail message to which a document is attached;
   a signature determination unit configured to determine whether or not a digital signature is appended to the e-mail message;
   a saving unit configured to save the document attached to the e-mail message as an approved document, which is approved for printing, when the signature determination unit determines that the digital signature is appended to the e-mail message, and save the document attached to the e-mail message as a non-approved document, which is not approved for printing, in association with an e-mail address of the e-mail message when the signature determination unit determines that the digital signature is not appended to the e-mail message;
   an acquisition unit configured to acquire user information;
   a retrieval unit configured to retrieve the non-approved document saved in association with an e-mail address that is associated in advance with the user information;
   a re-saving unit configured to change the non-approved document retrieved by the retrieval unit to an approved document, and saves the approved document;
   a setting screen display unit configured to display a screen required to set the user information and the e-mail address in association with each other; and
   an e-mail address determination unit configured to determine whether or not an e-mail address of the e-mail message received by the e-mail reception unit is the e-mail address which is associated in advance with the user information by the setting screen display unit,
   wherein when the e-mail address determination unit determines that the e-mail address of the received e-mail message is the e-mail address which is associated in advance with the user information, the signature determination unit determines whether or not a digital signature is appended to the e-mail message.

2. The apparatus according to claim 1, further comprising:
   a list display unit configured to displays a list of the non-approved documents retrieved by the retrieval unit,
   wherein the re-saving unit changes the non-approved document, which is selected by a user indicated by the user information from the list of the non-approved documents displayed by the list display unit, to an approved document, and saves the approved document.

3. The apparatus according to claim 1, wherein the user information includes an ID and a password.

4. The apparatus according to claim 1, wherein the approved document is a document, which is to be charged for printing.

5. A control method of an e-mail attached document executed by an information processing apparatus, the method comprising:
   an e-mail reception step of receiving an e-mail message to which a document is attached;
   a signature determination step of determining whether or not a digital signature is appended to the e-mail message;
   a saving step of saving the document attached to the e-mail message as an approved document, which is approved for printing, when it is determined in the signature determination step that the digital signature is appended to the e-mail message, and saving the document attached to the e-mail message as a non-approved document, which is not approved for printing, in association with an e-mail address of the e-mail message when it is determined in the signature determination step that the digital signature is not appended to the e-mail message;
an acquisition step of acquiring user information;
a retrieval step of retrieving the non-approved document saved in association with an e-mail address that is associated in advance with the user information;
a re-saving step of changing the non-approved document retrieved in the retrieval step to an approved document, and saving the approved document;
a setting screen display step of displaying a screen required to set the user information and the e-mail address in association with each other; and
an e-mail address determination step of determining whether or not an e-mail address of the e-mail message received in the e-mail reception step is the e-mail address which is associated in advance with the user information in the setting screen display step,
wherein the signature determination step is responsive to a determination that the e-mail address of the received e-mail message is the e-mail address which is associated in advance with the user information.

6. A non-transitory computer-readable storage medium storing a program for controlling a computer to function to:
receive an e-mail message to which a document is attached;
determine whether or not a digital signature is appended to the e-mail message;
save the document attached to the e-mail message as an approved document, which is approved for printing, when it is determined that the digital signature is appended to the e-mail message, and save the document attached to the e-mail message as a non-approved document, which is not approved for printing, in association with an e-mail address of the e-mail message when it is determined that the digital signature is not appended to the e-mail message;
acquire user information;
retrieve the non-approved document saved in association with an e-mail address that is associated in advance with the user information;
change the retrieved non-approved document to an approved document, and save the approved document;
display a screen required to set the user information and the e-mail address in association with each other; and
determine whether or not an e-mail address of the e-mail message received is the e-mail address which is associated in advance with the user information,
wherein the determination of whether or not a digital signature is appended to the e-mail message is responsive to a determination that the e-mail address of the received e-mail message is the e-mail address which is associated in advance with the user information.

* * * * *